(12) United States Patent
Horn et al.

(10) Patent No.: US 6,980,519 B1
(45) Date of Patent: Dec. 27, 2005

(54) MULTI-TABLE BASED GRANT GENERATOR FOR IMPROVED GRANULARITY IN AN ATM-PON

(75) Inventors: David N Horn, Summit, NJ (US); Kyeong-Soo Kim, Edison, NJ (US); J H J Maessen, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 627 days.

(21) Appl. No.: 09/616,408

(22) Filed: Jul. 14, 2000

(51) Int. Cl.[7] ............................................. G01R 31/08
(52) U.S. Cl. ...................................... 370/235; 370/395.5
(58) Field of Search .............................. 370/235, 395.5, 370/236, 395.1, 441, 431, 437, 445, 468; 398/58, 66, 70, 75

(56) References Cited

U.S. PATENT DOCUMENTS

| | | | | |
|---|---|---|---|---|
| 5,481,680 A | * | 1/1996 | Larson et al. ................ | 710/112 |
| 5,835,494 A | | 11/1998 | Hughes et al. ............... | 370/397 |
| 5,912,998 A | * | 6/1999 | Quayle ......................... | 385/24 |
| 6,064,652 A | * | 5/2000 | Buckland et al. ............ | 370/235 |
| 6,298,049 B1 | * | 10/2001 | Vanhoof et al. ............. | 370/329 |
| 6,424,656 B1 | * | 7/2002 | Hoebeke ...................... | 370/412 |
| 6,570,886 B1 | * | 5/2003 | De Groote et al. .......... | 370/442 |

FOREIGN PATENT DOCUMENTS

| | | | | |
|---|---|---|---|---|
| EP | 000565739 A1 | * | 10/1993 | ............ H04B/10/20 |
| EP | 0 957 654 A1 | | 5/1998 | ............ H04Q/11/04 |
| WO | WO 97/19567 | | 11/1996 | ............. H04Q/1/20 |

OTHER PUBLICATIONS

Kim., "An Optimized ATM–PON Based FTTH Access Network", Sep. 1997, pp 1800–1804.*

* cited by examiner

Primary Examiner—Melvin Marcelo
(74) Attorney, Agent, or Firm—Matthew J. Hodulik (57) ABSTRACT

A multi-table-based grant generator in accordance with the present invention solves the issue of bandwidth granularity, while maintaining the simplicity of a table approach. The present invention grant generator provides grants of fine granularity for regulation of upstream transmission of cells in an ATM PON. Multiple grant tables having differing bandwidth granularities are linked together through a simple grant distribution mechanism. The grant tables and grant distribution mechanisms can be recursively linked to achieve a number of different granularities. The grant generator of the present invention is based on multiple grant tables with a combination of multiplexers, dividers, and address counters. The grant generator provides both larger and smaller bandwidths for data grants as well as PLOAM grants without large size grant tables. In one exemplary embodiment of the present invention, improved granularity is achieved, where a first grant table is used for one size of bandwidth grant, e.g., data grants, and the second grant table is used for another size of bandwidth grant, e.g., low bandwidth data grants as well as PLOAM grants. A simple clock divider couples to each of the grant tables through corresponding address counters. The clock divider provides a set number of bandwidth grants from each table over a complete cycle. The clock divider also selects an appropriate input port of a multiplexer through which the grants from each grant table are respectively transmitted. By having the ability to issue variable sized bandwidth grants, the granularity is significantly improved, thereby translating to a more efficient use of the bandwidth. More specifically, grants of a finer granularity can be issued without the need for an excessively large grant table usually thought to be necessary to produce fine granularities.

17 Claims, 5 Drawing Sheets

FIG. 4
RECURSIVE IMPLEMENTATION OF GRANT GENERATOR USING MULTI-TABLES

EXAMPLE TIMING DIAGRAM FOR INPUT AND OUTPUT SIGNALS OF CLOCK DIVIDER WITH DIVISION RATIO 5:2

MULTI-TABLE BASED GRANT GENERATOR FOR IMPROVED GRANULARITY IN AN ATM-PON

FIELD OF THE INVENTION

The present invention relates generally to Asynchronous Transfer Mode (ATM) communication systems and more particularly to ATM communication systems employing Passive Optical Networks (PONs).

BACKGROUND OF THE INVENTION

Asynchronous Transfer Mode-Passive Optical Networks (ATM-PONs) are considered a promising solution for fiber-based access networks for end-users in Fiber-To-The-Home (FTTH)/Fiber-To-The-Building (FTTB) environments. ATM-PONs utilize a tree topology where a passive optical splitter/merger provides broadcasting in the downstream direction and merging in the upstream direction. The splitter/merger typically couples to a single Optical Line Termination unit (OLT) in the upstream direction and to multiple Optical Network Termination units (ONTs) in the downstream direction, thus providing the tree topology. The OLT provides the network-side interface of the optical access network, while the ONTs provide the customer-side interface to the optical access network. Because all incoming ATM cells from ONTs are combined into one cell stream en route to the OLT through the optical merger, there may be collisions among upstream (ONT to OLT) cells from different ONTs unless proper preventative mechanisms are employed.

According to ITU-T G.983.1, a grant allocation technique is used to control upstream cell transfer from ONTs. A grant is permission from the OLT for an ONT to send one upstream cell at a specified slot. Grants are conveyed in downstream Physical Layer Operation and Maintenance (PLOAM) cells. With this mechanism, the OLT can have full control over ONTs in the upstream cell transmission and avoid collisions among them once all ONTs are placed at the same logical distance after ranging. The downstream frame format for a standard 155.52/155.52 Mbits/s PON includes 56 ATM cells with two PLOAM cells, a first PLOAM cell having 27 upstream grants and a second PLOAM cell having 26 upstream grants for a total of 53 upstream grants per frame. The upstream frame format includes 53 cells with three (3) overhead bytes per cell.

One method of generating grants in passive optical networks (PONs) is to use a (static) grant table. In this technique, each PLOAM cell sequentially distributes the next 27/26 entries from the grant table downstream to the ONTs. As would be understood, the upstream bandwidth afforded each table entry can be calculated as: (Total Upstream Bandwidth)/(Table Size). Other methods of grant generation also exist, such as, software control and computer logic control techniques. A disadvantage of software controlled grant generation is the relatively large CPU overhead associated therewith. In addition, computer logic controlled grant generation techniques are considered to be either overly complex to implement, or are considered to provide unsuitably low performance. Accordingly, computer logic control techniques are not yet a viable option for grant generation in PONs. Of the above methodologies, the single grant table approach is the most attractive in that it has arbitrarily fine granularity and requires no constant software overhead. A significant disadvantage, however, is that extremely large sizes of grant tables are necessary to achieve fine granularity. Fine granularity is desirable, for example, to efficiently accommodate PLOAM grants. Accordingly, there is a need to provide a simplified grant generation technique for use in passive optical networks that can also provide fine granularity grants.

SUMMARY OF THE INVENTION

A multi-table-based grant generator in accordance with the present invention solves the issue of bandwidth granularity, while maintaining the simplicity of a table approach. The present invention grant generator provides grants of fine granularity for regulation of upstream transmission of cells in an ATM PON. Multiple grant tables having differing bandwidth granularities are linked together through a simple grant distribution mechanism. The grant tables and grant distribution mechanisms can be recursively linked to achieve a number of different granularities.

The grant generator of the present invention is based on multiple grant tables with a combination of multiplexers, clock dividers, and address counters. The grant generator provides both larger and smaller bandwidths for data grants as well as PLOAM grants without large size grant tables. In one exemplary embodiment of the present invention, improved granularity is achieved, where a first grant table is used for one size of bandwidth grant, e.g., data grants, and the second grant table is used for another size of bandwidth grant, e.g., low bandwidth data grants as well as PLOAM grants. A clock divider couples to each of the grant tables through corresponding address counters. The clock divider provides a set number of bandwidth grants from each table over a complete cycle. The clock divider also selects an appropriate input port of a multiplexer through which the grants from each grant table are respectively transmitted. By having the ability to issue variable sized bandwidth grants, the granularity is significantly improved, thereby translating to a more efficient use of the bandwidth. More specifically, grants of a finer granularity can be issued without the need for an excessively large grant table usually thought to be necessary to produce fine granularities.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Figure 1:
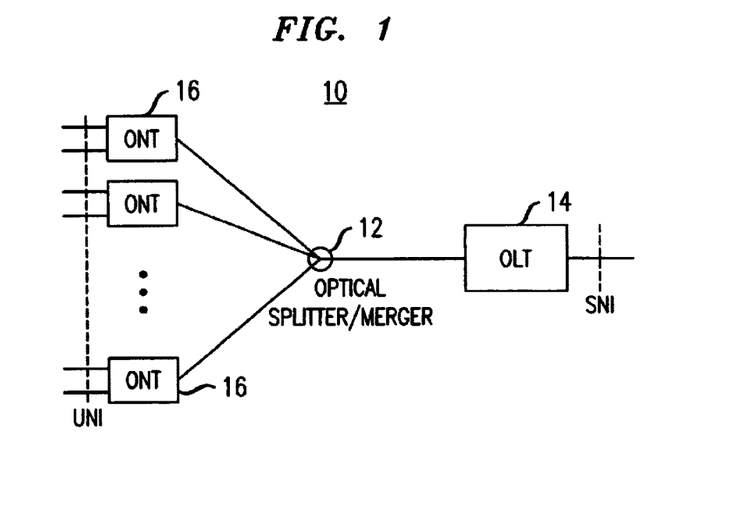
FIG. 1 is an exemplary embodiment of an ATM passive optical network (PON) configured in a tree topology.

Asynchronous Transfer Mode-Passive Optical Networks (ATM-PONs) are being used in fiber-based access networks that are used to communicate with end-users in Fiber-To-The-Home (FTTH)/Fiber-To-The-Building (FTTB) environments. FIG. 1 shows an exemplary ATM-PON 10 configured in a basic tree topology. A passive optical splitter/merger 12 couples to a single Optical Line Termination (OLT) unit 14 in an upstream direction and to multiple Optical Network Termination (ONT) units 16 in a downstream direction. The passive optical splitter/merger 12 provides broadcasting in the downstream direction and merging in the upstream direction. In the exemplary ATM-PON shown in FIG. 1 and in accordance with ITU-T Recommendations G.983-1 and 983-2, part of the Full Services Access Networks (FSAN) initiative, the OLT 14 provides the network-side interface of the optical access network, while the ONTs 16 provide the customer-side interface to the optical access network.

Figure 2:
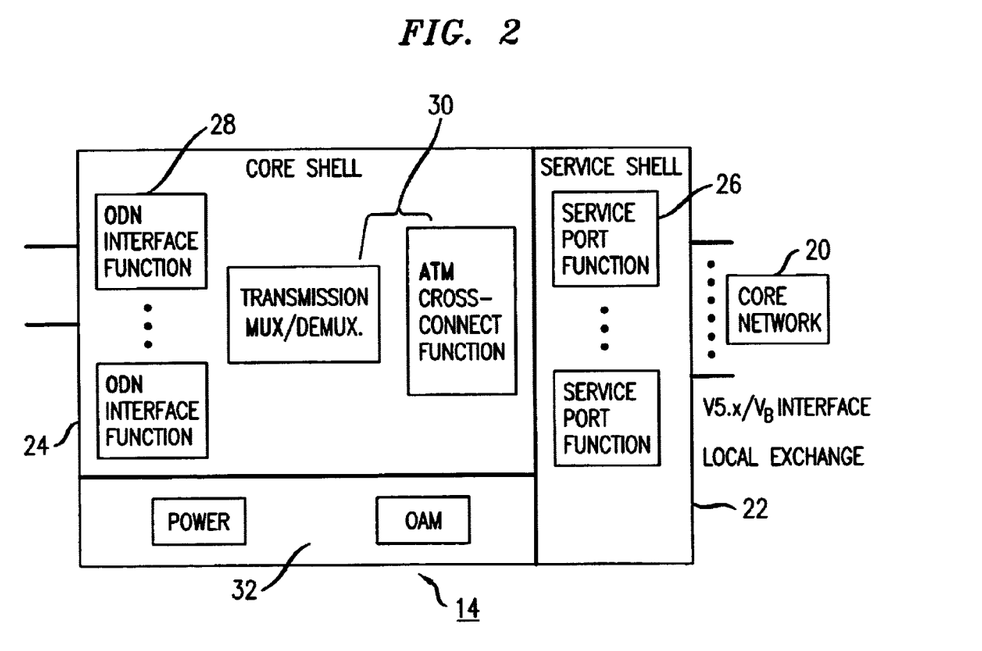
FIG. 2 is an exemplary block diagram of an optical line termination (OLT) unit used in a passive optical network.

Referring to FIG. 2, a functional block diagram of an exemplary OLT 14 is shown. The OLT 14 is typically coupled to a switched network 20 via standardized interfaces 22 (e.g., VB5.x, V5.x, NNI's). At its distribution side 24, the OLT presents optical accesses according to agreed upon requirements, e.g., in terms of bit rate or power budget. Viewed from a high level, the OLT 14 is generally comprised of service ports 26, an optical distribution network (ODN) interface 28, and MUX 30 for VP/VC management, as well as power and operation administration and maintenance functions 32.

In general, the service ports 26 interface to service nodes in the network. The service ports insert ATM cells into the upstream synchronous digital hierarchy (SDH) payload and extract ATM cells from the downstream SDH payload. The MUX 30 provides VP (virtual path) connections between the service ports 26 and the ODN interface 28 and different VPs are assigned to different services. Information such as main contents, signaling, and OAM flows is exchanged by using VCs (virtual channels) of the VP. In the ODN interface 28, a PON Line Terminal handles the optoelectronic conversion process. The ODN interface 28 inserts ATM cells into the downstream PON payload and extracts ATM cells from the upstream PON payload.

The OLT 14 in an ATM-PON has fill control over upstream traffic in ONTs by issuing grants. A grant allocation technique is used to control upstream cell transfer from ONTs 16 to the OLT 14. Grant allocation is used to coordinate upstream transmission of cells from the ONTs. As would be understood, a grant is permission for an ONT to send one upstream cell at a specified slot. The grant is conveyed in downstream Physical Layer Operation and Maintenance (PLOAM) cells. The current ITU recommendations specify one data grant per ONT at a time.

Figure 3:
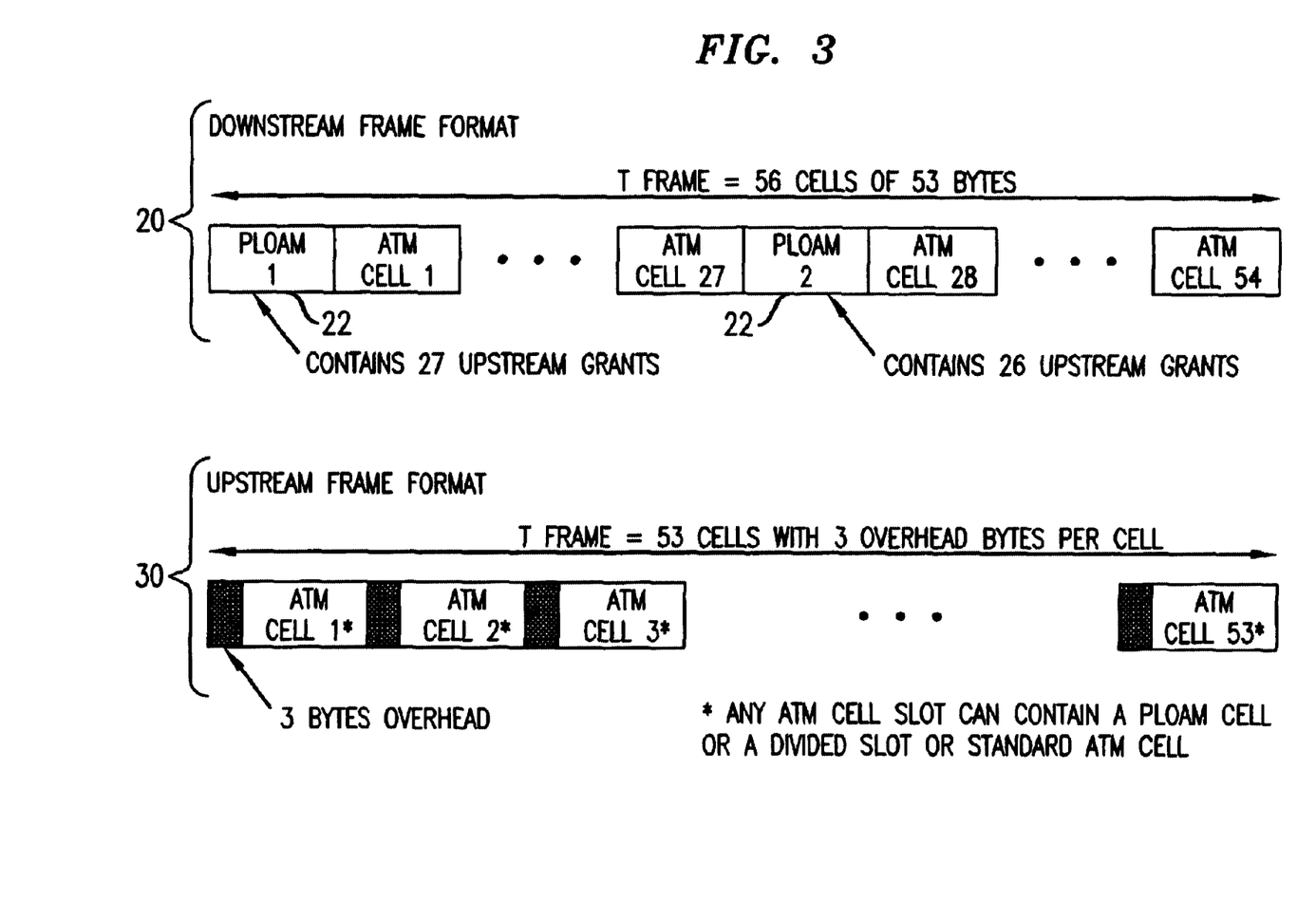
FIG. 3 is an illustration of the upstream and downstream frame structure for an ATM passive optical network (PON)

The downstream interface structure for both 155.52 Mbit/s and 622.08 Mbit/s ATM-PON channels consists of a continuous stream of timeslots, each timeslot containing 53 octets of an ATM cell or a PLOAM cell. As shown in FIG. 3, a downstream frame 20 includes two PLOAM cells 22 and is 56 slots long for the 155 Mbit/s downstream case. Every 28 time slots a PLOAM cell is inserted. For the 622 Mbit/s case, the frame includes eight PLOAM cells and is 224 slots long (not shown).

In the upstream direction the frame 30 includes 53 time slots of 56 bytes. As discussed, the OLT requests an ONT (generically referred to as an optical network unit (ONU)) to transmit an ATM cell via grants conveyed in downstream PLOAM cells. Any time slot can contain an ATM cell, a PLOAM cell, or a divided slot. At a programmable rate, the OLT requests an ONU to transmit a PLOAM cell or a minislot. The upstream PLOAM rate depends on the required functionality contained in these PLOAM cells. The minimum PLOAM rate per ONU is one PLOAM cell every 100 ms.

Downstream grants are used by the ONUs for access on the upstream fiber. There are 53 grants per frame. The 53 grants are mapped in the first two PLOAM cells of the downstream frame, 27 in the first cell and 26 in the second cell. The grant fields of the six remaining PLOAM cells for the asymmetrical (622 Mbits/s) case are all filled with idle grants and hence will not be used by the ONU. The length of a grant is 8 bits.

Two specific grant types having particular relevance to the present invention are data grants and PLOAM grants. A data grant is used to assign a specific upstream slot to a particular ONU for transmission of a data cell. The value or address of the data grant is assigned to the ONU during the ranging protocol using a grant allocation message. The ONU can send a data cell or an idle cell if no data cell is available. A PLOAM grant is used to assign a specific slot for a PLOAM grant to a particular ONU. The value of the PLOAM grant is also assigned to the ONU during the ranging protocol using a grant allocation message. The ONU always sends a PLOAM cell in response to this grant. The OLT can address 32 ONUs at the same time and optionally it may address up to 64 ONUs.

ITU-T G.983.1 specifies that the upstream minimum PLOAM cell rate per ONU (ONT) shall be one PLOAM cell every 100 ms. Because in the upstream, each cell is delivered with 3 overhead bytes, the time it takes to transmit one cell for the 155.52 Mb/s interface would be 2.88 $\mu$s. Based on the minimum PLOAM cell rate, one PLOAM grant should be generated every 34714 (=100 ms/2.88 $\mu$s) cells. Therefore, if a grant generator is implemented based on a single grant table (without dynamic content updating), the table is required to hold at least 34714 entries to provide this minimal bandwidth granularity for PLOAM cells. If the table size is smaller, then the corresponding bandwidth granularity will be much higher than the minimum PLOAM cell rate—translating into wasted bandwidth and extra software overhead processing the POAM cells. This bandwidth granularity issue applies to low bit rate user ATM cells, as well.

In a single grant table system, the larger the grant table, the finer the granularity that can be achieved. In other words, granularity is inversely proportional to the size of the grant table, y, where (Total Bandwidth)*(1/y) is indicative of the granularity. The large size of the grant table necessary to achieve smaller bandwidth granularity is a problem, however, since in passive optical networks employing OLTs and ONTs, the PON-related functionality is to be implemented in FPGA or ASIC chips and memory allocation is therefore limited. To conserve memory allocation on the chips, most early implementations of OLTs provide very large bandwidth granularity, on the order of three (3) Mbit/s.

As discussed in the background and above, an impediment to achieving fine granularity grants in an ATM-PON using a single grant table allocation technique is that the size of the single grant table is considered to be unreasonably large. The present invention is a grant generator based on multiple grant tables and includes a combination of multiplexers, clock dividers, and address counters. This multi-table-based grant generator solves the issue of bandwidth granularity, while keeping the simplicity of a table approach. With the grant generator of the present invention, both larger and smaller bandwidths for data grants as well as PLOAM grants can easily be provided without large size grant tables. The present invention enables grants of fine granularity to be generated for upstream transmission of cells in an ATM PON. Multiple grant tables having differing bandwidth granularities are linked together through a simple grant distribution mechanism. The grant tables and grant distribution mechanisms can be recursively linked to achieve a number of different granularities.

Figure 4:
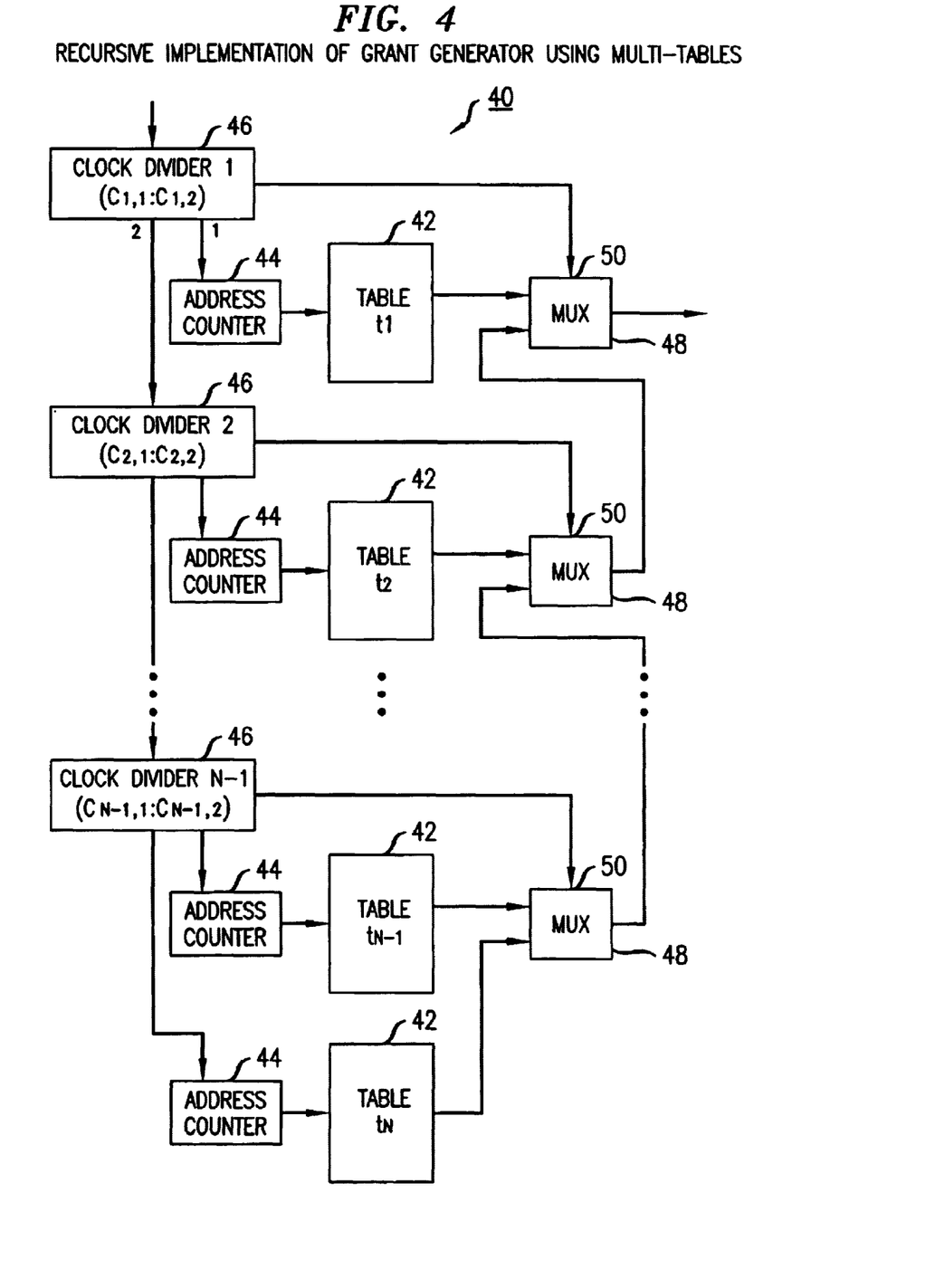
FIG. 4 is an exemplary block diagram of a generic grant generator in accordance with the present invention.

FIG. 4 shows a block diagram for a generalized implementation of a multiple table grant generator 40 in accordance with the present invention. FIG. 4 shows a recursive implementation of the proposed multi-table-based grant generator with N grant tables 42 of varying size. The actual number of grant tables utilized depends on the specific application of that PON. Each grant table 42 also denoted in the figure as $t_i$ (i=1, 2, 3, ..., N) can hold $n_i$ grants. Each of the grant tables 42 couples to a corresponding address counter 44. The address counter outputs addresses that correspond to addresses in the grant tables. Accordingly, upon being incremented, the address counters sequentially address each of the entries in their corresponding grant table 42.

The grant generator 40 also includes (N−1) clock dividers 46 and (N−1) multiplexers 48. The clock dividers 48 trigger a corresponding address counter 46 for a first number of counts and also trigger a subsequent clock dividers 46 (or address counter) for a second number of counts. Fine bandwidth granularities can be achieved through the use of multiple grant tables coupled together according to the illustrated recursive structure. As would be understood, the number of grants from each of the grant tables can be controlled by altering the distribution of clocks from the clock dividers 46. The input channels 50 of the multiplexers 48 would also be correspondingly altered in accordance with the distribution of the clock dividers 46 to select an appropriate first or second input channel in accordance with the output of the grant table.

Figure 5A:
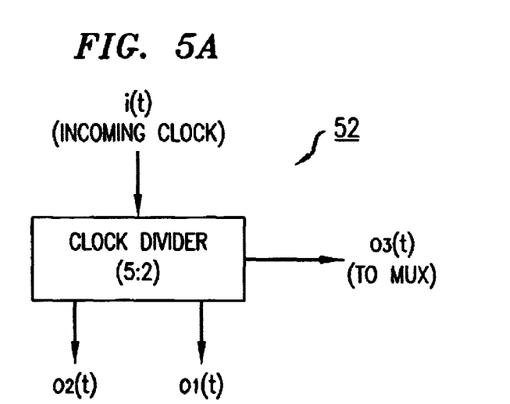
FIG. 5A shows an exemplary clock divider circuit.
Figure 5B:
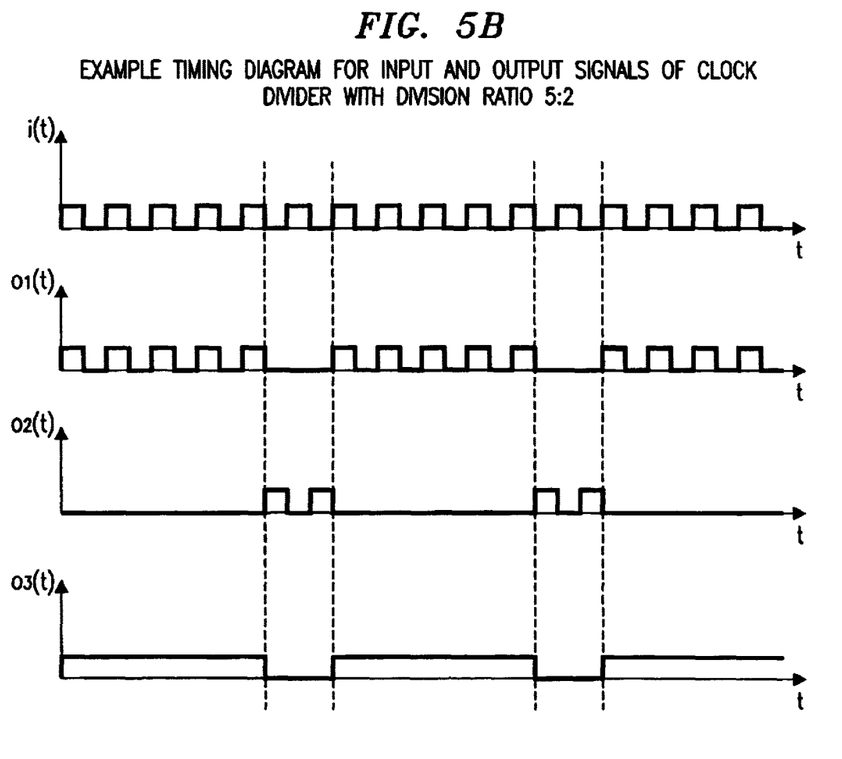
FIG. 5B shows timing diagrams for the exemplary clock divider circuit of FIG. 5A.
Figure 6:
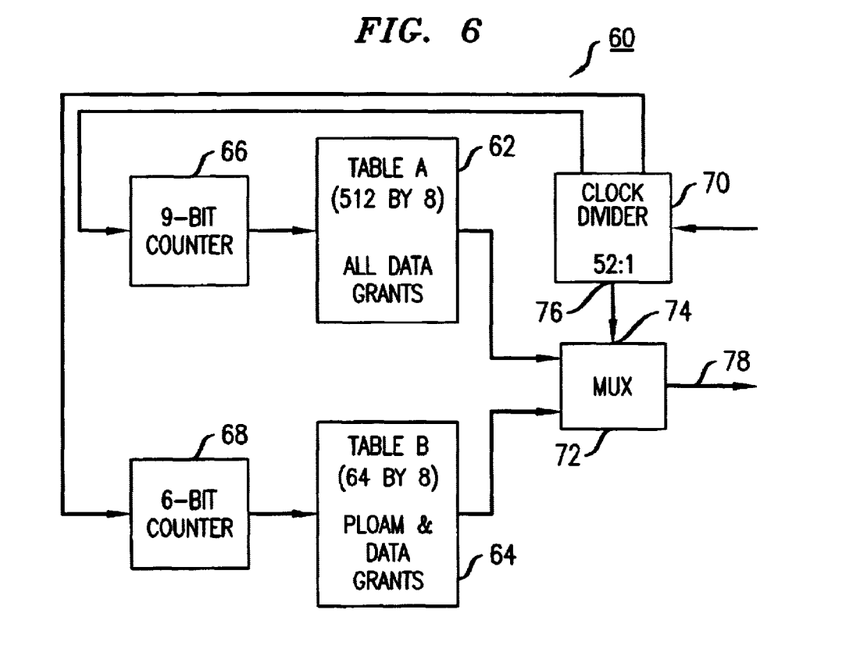
FIG. 6 is an exemplary embodiment of a grant generator in accordance with the present invention which uses two grant tables.

The bandwidth granularities achieved for a single entry in each grant table can be calculated in accordance with Equation 1 below. In equation 1, N equals the number of grant tables and each table $t_i$ (i=1, 2, 3, ..., N) can hold $n_i$ grants. A clock divider i divides incoming clock pulses to its two outputs with the ratio of $C_{i,1}:C_{i,2}$. Exemplary timing diagrams for a clock divider 52 of FIG. 5A are shown in FIG. 5B. As shown, the clock divider 52 has a division ration of 5:2 for its output signals ($O_2(t)$, $O_1(t)$), respectively, based on the incoming clock signal i(t). It should also be noted that the first expression in Equation 1 has the total bandwidth (155 Mbits/s) multiplied by 53/56. This represents the useable bandwidth since each upstream frame includes the equivalent of 3 cells of overhead. Equation 1 represents the upstream bandwidth (granularity, $G_i$) in Mbit/s corresponding to one entry in the table $t_i$.

ing two grant tables. Referring to FIG. 6, the exemplary grant generator 60 includes a first grant table 62 (Table A) and a second grant table 64 (Table B). As shown, the first grant table 62 is a 512×8-bit grant table and the second grant table 64 is a 64×8-bit grant table. As will become apparent the grant tables can be of other sizes than that illustrated in the exemplary embodiment.

A first address counter 66 and a second address counter 68 couple to the input of the first and second grant tables 62, 64, respectively, for sequentially addressing and accessing grant table locations in the corresponding grant table. For instance, in the case of the first grant table 62, a 9-bit counter is included in order to sequentially address each of the 512 grant table locations ($2^9$=512). In the case of the second table 64, a 6-bit counter is included in order to address each of the 64 grant table locations ($2^6$=64). A clock divider 70 with division ration 52:1 couples to the first and second address counters 66, 68 such that 52 of the 53 output pulses or counts from the clock divider 70 are input to the first counter 66 and 1 of the 53 counts is input to the second counter 68. Each of the counters 66, 68 acts to address an appropriate grant from either Table A or Table B. Accordingly, 52 of the 53 output pulses from the clock divider are input to the first address counter 66 which is incremented 52 times during a complete cycle of the clock divider 70. One (1) of the 53 output pulses is input to the second counter 68 which is incremented by a single count each cycle. As would be understood, the outputs from each of the counters 66, 68 are fed into the respective grant tables 62, 64 in order to select specific addresses therein.

An output from each of the grant tables 62, 64 couples to a separate input channel of a multiplexer 72. The clock divider 70 is also coupled to the multiplexer 72 through select channel inputs 74 of the multiplexer 72. Outputs 76 from the clock divider 70 act to select the appropriate input channel (between Table A and B) of the multiplexer 72 that will be output from the output port 78 thereof. The grants from the grant generator 60 which are output from the multiplexer 72 are fed into appropriate locations of the PLOAM cells and transmitted downstream in the PON to be received by the designated ONT. As would be understood, the clock divider 70 is used in the exemplary embodiment so that a full cycle of 53 grants is completed for each downstream frame.

Using the above equation for the two grant table embodiment of FIG. 4, where N=2, $C_{1,1}$=52, $C_{1,2}$=1, $n_1$=512, $n_2$=64, the upstream bandwidths corresponding to a single entry in each of grant Table A and grant Table B are 282 kbit/s and 43 kbit/s, respectively. This is a significant improvement in bandwidth granularity as compared to the prior art devices which maintained minimum bandwidth granularites on the order of 3 Mbit/s. As was noted, the minimum PLOAM cell rate per ONU specified in ITU-T G.983.1 is one PLOAM $$G_i = \begin{cases} \dfrac{155.52 \times 53}{56} \times \dfrac{C_{1,1}}{C_{1,1}+C_{1,2}} \times \dfrac{1}{n_1} & \text{Mbit/s}, i = 1, \\ \dfrac{155.52 \times 53}{56} \times \prod_{j=1}^{i-1} \dfrac{C_{j,2}}{C_{j,1}+C_{j,2}} \times \dfrac{C_{i,1}}{C_{i,1}+C_{i,2}} \times \dfrac{1}{n_1} & \text{Mbit/s}, i = 2, \ldots, N-1, \\ \dfrac{155.52 \times 53}{56} \times \prod_{j=1}^{N-1} \dfrac{C_{j,2}}{C_{j,1}+C_{j,2}} \times \dfrac{1}{n_N} & \text{Mbit/s}, i = N. \end{cases} \quad \text{Equation 1}$$

The present invention is further explained with respect to an exemplary implementation of a grant generator employcell every 100 ms or 42.4 kbit/s in bit rate. Thus, the present invention closely tracks the bandwidth of a PLOAM cell using a grant from Table B (43 kbits/s). As can be seen, very little bandwidth is wasted when utilizing the low bandwidth grants (from Table B) in accordance with the present invention.

A comparison of the multi-table grant generation technique of the present invention with that of the simple one table approach of the prior art reveals that the present invention offers a significant savings in memory. More specifically, the multi-table grant generation technique of the present invention requires 576 bytes of grant table memory in order for its implementation compared to 34,714 bytes of memory for the single table approach. Thus, the present invention is able to achieve a similar level of granularity to that of the single table approach using approximately 1/53 of the required memory. This reduction in memory for the instant application of PON equipment is important since the OLT circuitry is preferably implemented in a FPGA or ASIC.

Improved granularity is achieved utilizing the present invention, since the first grant table 62 is used for one size of bandwidth grant, e.g., data grants, and the second grant table 64 is used for another size of bandwidth grant, e.g., low bandwidth data grants as well as PLOAM grants. As illustrated in FIG. 6, the grant generator 60 distributes 52 grants from Table A, one grant from Table B, another 52 grants from Table A, one grant from Table B, and so on. By having the ability to issue variable sized bandwidth grants, the granularity is significantly improved, thereby translating to a more efficient use of the bandwidth. More specifically, grants of a finer granularity can be issued without the need for an excessively large grant table usually thought to be necessary to produce fine granualarities. (This would be the case if all the grants in a single grant table were used for minimum bandwidth granularity grants.) Thus, the grant generator of the present invention can be considered to be somewhat of a hybrid in that different granularities of bandwidth grants are issued utilizing the same grant generator.

As would be understood, the number of low bandwidth grants can easily be varied (e.g., during manufacture of the OLT) by altering the number of inputs to the second address counter 66, or other address counters and/or clock divider in the case of the recursive model. This may be done in order to more efficiently distribute the bandwidth to thereby accommodate additional low bandwidth requests. Various combinations of grants are possible with the number of inputs to the second address counter and the size of the second grant table being altered to achieve specific granularities.

The contents of each grant table will change when the makeup of the connections changes at the OLT. That is, when additional ONTs begin active communication over the network to and from an end user, the grant tables in the network are updated to include those active ONTs. More specifically, for normal switched connections, there will be a connection setup (for creating connections) or a connection teardown (for terminating connections). These procedures take place before actual connection creation or connection termination. During these procedures, the bandwidth is negotiated between the user at the ONT side and the network link at the OLT side, at which point the grant table contents are updated. For permanent connections, there will be no such systematic procedures for setup and teardown. In this instance, connection setup and teardown are provided by the network operator, where updating of the grant tables would be accomplished at or around the same time.

Figure 7:
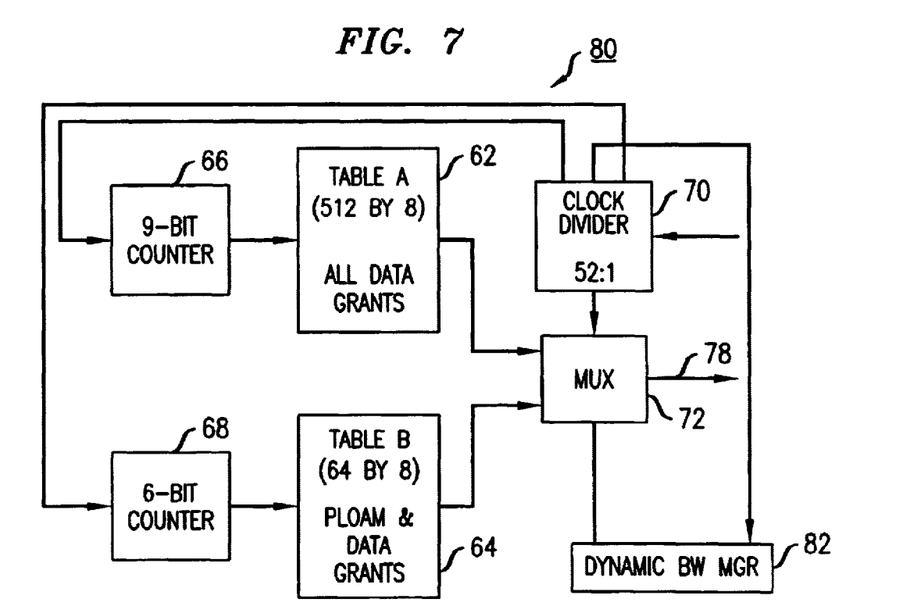
FIG. 7 is an another exemplary embodiment of a grant generator in accordance with the present invention which uses a dynamic bandwidth management logic in connection with two grant tables.

The foregoing is merely illustrative of the principles of the invention. Those skilled in the art will be able to devise numerous arrangements, which, although not explicitly shown or described herein, nevertheless embody those principles that are within the spirit and scope of the invention. For example, although the present invention is described as a grant generation scheme driven by a clock divider, it would be understood that other implementations are also possible. For example, the assignments of grants from each grant table could take place from a program stored within a digital processor. In addition, the grant generator of the present invention may also include Dynamic Bandwidth Control Logic that overwrites certain slots based on receipt of a triggering parameter. The trigger can include, for example, an estimation of queue length from minislot feedback or simply the amount of idle cells received. An exemplary embodiment of the present invention that includes dynamic bandwidth Control Logic is shown in FIG. 7. The grant generator 80 of FIG. 6 is similar to the grant generator shown in FIG. 6 with the exception that a Dynamic Bandwidth Manager (DBWM) functional block 82 is shown coupled to the divide-by-53 counter and the multiplexer. The DBWM 82 can "steal" a percentage of bandwidth for its usage from one of the counters (usually the first) or a reserved pattern within Table A, for example, can be used to select the DBWM. Many other modifications and applications of the principles of the invention will be apparent to those skilled in the art and are contemplated by the teachings herein. Accordingly, the scope of the invention is limited only by the claims appended hereto.

What is claimed is:

1. A grant generator apparatus for generating grants of available transmission channel bandwidth in a network, said apparatus comprising:

a first grant table for storing therein grants corresponding to a first-size of said available transmission channel bandwidth, at least one other grant table for storing therein grants corresponding to a second-size of said available transmission channel bandwidth; and a grant distributor coupled to said first and said at least one other grant table for distributing a first number of grants from said first table and at least a second number of grants from said other grant table according to a predetermined pattern, wherein said grant distributor includes a clock divider coupled to said first and said at least one other grant table, said clock divider receiving a reference clock signal and outputting a first and at least a second clock frequency based on said reference clock signal, said clock divider providing a first number of grant selections to said first grant table and at least a second number of grant selections to said other grant table based on said first and second clock frequency, respectively, said first and second number of grant selections corresponding to said first and second number of grants.

2. The apparatus of claim 1, wherein said network is a passive optical network (PON).

3. The apparatus of claim 2, wherein said passive optical network (PON) is an ATM-PON.

4. The apparatus of claim 1, further including a first address counter and at least a second address counter coupled between said clock divider and said first and other grant table, respectively, said first and second address counter operable to sequentially select grant table locations in said first and other grant table in accordance with said grant table selections from said clock divider.

5. The apparatus of claim 4, further including a multiplexer coupled to outputs of said first and other grant table and to outputs of said clock divider, said clock divider selecting an appropriate input port of said multiplexer for output of grants therefrom based on the grant selection of said clock divider.

6. The apparatus of claim 5, wherein said grant generator includes N grant tables and N corresponding address counters, said grant generator further including (N−1) clock dividers and (N−1) multiplexers, said clock dividers and said multiplexers coupled to said N grant tables and address counters in a recursive structure.

7. The apparatus of claim 1, further including dynamic bandwidth management control logic operable to alter slots in one or more grant tables based on receipt of a triggering parameter.

8. The apparatus of claim 7, wherein contents of said grant tables are updated upon a change in end user connections of said network.

9. A grant generator apparatus for generating upstream grants of available transmission channel bandwidth in a passive optical network, said apparatus comprising:
- a first grant table for storing therein grants of a first bandwidth granularity of said available transmission channel bandwidth,
- at least one second grant table for storing therein grants of a second bandwidth granularity of said available bandwidth channel bandwidth; and
- a grant distributor coupled to said first and second grant table for distributing a first number of grants from said first table and at least a second number of grants from said second table according to a predetermined pattern,
- wherein said first grant table, said second grant table and said grant distributor are recursively coupled to produce finer granularity grants at subsequent levels and wherein said grant distributor includes a clock divider coupled to said first and said at least one second grant table, said clock divider providing a first number of grant selections to said first grant table and at least a second number of grant selections to said second grant table, said first and second number of grant selections corresponding to said first and second number of grants.

10. The apparatus of claim 9, wherein said predetermined pattern is selected to substantially accommodate low bandwidth requests in said network.

11. The apparatus of claim 9, wherein said passive optical network (PON) is an ATM-PON.

12. The apparatus of claim 11, wherein said grant generator is included in an OFT of said ATM-PON.

13. The apparatus of claim 12, wherein said grant generator is implemented in a medium selected from the group consisting of FPGA and ASIC.

14. The apparatus of claim 11, wherein the content of said grant tables is updated upon a change in end user connections at said ATM-PON.

15. The apparatus of claim 9, further including dynamic bandwidth management control logic operable to alter slots one or more grant table based on receipt of a triggering parameter.

16. A method of generating bandwidth grants in a passive optical network, said method comprising the steps of:
- providing a first grant table for storing grants of a first bandwidth granularity therein;
- providing at least one other grant table for storing grants of at least a second bandwidth therein; and
- distributing grants from said first grant table and from said other grant table downstream to ONT units coupled to said PON, a first number of grants being distributed from said first table and a second number of grants being distributed from said second table over a complete grant cycle, wherein said grant cycle repeats itself upon completion,
- wherein said step of distributing includes utilizing a clock divider to provide a first number of grant selections to said first grant table and at least a second number of grant selections to said second grant table, said first and second number of grant selections corresponding to said first and second number of grants, and
- wherein said first grant table, said second grant table and said grant distributor are recursively coupled to produce finer granularity grants at subsequent levels.

17. The method of claim 16, wherein the content of said grant tables is updated upon a change in end user connections at said PON.

* * * * *